(12) United States Patent
Bhattacharya

(10) Patent No.: US 12,247,586 B2
(45) Date of Patent: Mar. 11, 2025

(54) DEVICE TO SHIFT STRUCTURAL RESONANCE IN A VERTICAL LONG SHAFT PUMP

(71) Applicant: Mantosh Isanchandra Bhattacharya, Patna (IN)

(72) Inventor: Mantosh Isanchandra Bhattacharya, Patna (IN)

( * ) Notice: Subject to any disclaimer, the term of this patent is extended or adjusted under 35 U.S.C. 154(b) by 285 days.

(21) Appl. No.: 17/919,720

(22) PCT Filed: Oct. 20, 2020

(86) PCT No.: PCT/IB2020/059830
§ 371 (c)(1),
(2) Date: Oct. 18, 2022

(87) PCT Pub. No.: WO2022/023807
PCT Pub. Date: Feb. 3, 2022

(65) Prior Publication Data
US 2023/0272807 A1 Aug. 31, 2023

(30) Foreign Application Priority Data
Jul. 31, 2020 (IN) .............................. 202011032975

(51) Int. Cl.
*F04D 29/66* (2006.01)
*F04B 47/06* (2006.01)
(Continued)

(52) U.S. Cl.
CPC ............ *F04D 29/669* (2013.01); *F04B 47/06* (2013.01); *H02K 5/18* (2013.01); *H02K 5/24* (2013.01);
(Continued)

(58) Field of Classification Search
CPC .... F04B 47/06; F04D 29/669; F04D 29/5806; F05D 2250/315; F05D 2260/22141;
(Continued)

(56) References Cited

U.S. PATENT DOCUMENTS

| 10,760,576 B2 * | 9/2020 | Tivarovsky | F16M 11/20 |
| 2006/0017335 A1 * | 1/2006 | Matin | H02K 9/225 |
| | | | 310/64 |

(Continued)

OTHER PUBLICATIONS

Jan. 12, 2021—(WO) International Search Report and Written Opinion—App PCT/IB2020/059830.

*Primary Examiner* — Charles G Freay
(74) *Attorney, Agent, or Firm* — Banner & Witcoff, Ltd.

(57) ABSTRACT

A simple and cost-effective device to shift a structural resonance in a vertical long shaft pump is disclosed. T disclosed device comprising portion of a motor of the vertical pump by using a plurality of fasteners, and one an upper plate and a lower plate being adapted for fitment at a non-driving end or more annular plates adapted for fitment at the non-driving end portion of the motor between the upper plate and the lower. Each of the one or more annular plates comprises an annular central hole with splined grooves to engage with cooling fins of the motor. The device further comprises tie rods for fitment with flanges of a column pipe of the vertical pump using Bellville washers and bolts, and mass blocks with matching square internal threading for fitment with the tie rods to add mass at required location.

10 Claims, 6 Drawing Sheets

(51) Int. Cl.
    *H02K 5/18* (2006.01)
    *H02K 5/24* (2006.01)
    *H02K 7/04* (2006.01)
    *H02K 15/16* (2006.01)
    *F04D 13/10* (2006.01)
    *F04D 29/58* (2006.01)

(52) U.S. Cl.
    CPC .............. *H02K 7/04* (2013.01); *H02K 15/16* (2013.01); *F04D 13/10* (2013.01); *F04D 29/5806* (2013.01); *F05D 2250/315* (2013.01); *F05D 2260/22141* (2013.01)

(58) Field of Classification Search
    CPC .. H02K 5/18; H02K 5/24; H02K 7/04; H02K 15/16
    See application file for complete search history.

(56) References Cited

U.S. PATENT DOCUMENTS

| | | | |
|---|---|---|---|
| 2009/0180874 A1* | 7/2009 | Gutierrez | F04D 13/02 415/219.1 |
| 2012/0067449 A1* | 3/2012 | Pesek | F04D 29/043 138/106 |
| 2016/0102668 A1 | 4/2016 | Tivarovsky | |
| 2016/0238036 A1 | 8/2016 | Gabhart | |

\* cited by examiner

DEVICE TO SHIFT STRUCTURAL RESONANCE IN A VERTICAL LONG SHAFT PUMP

CROSS-REFERENCE TO RELATED APPLICATIONS

The present application is a U.S. National Phase of International Application No. PCT/IB2020/059830, which was filed on Oct. 20, 2020, designating the United States of America and claiming priority to Indian Application No. 202011032975, filed on Jul. 31, 2020. This application claims priority to and the benefit of the above-identified applications, which are all fully incorporated by reference herein in their entireties.

TECHNICAL FIELD

The present disclosure relates generally to vertical long shaft pumps. More specifically, it pertains to a simple and efficient site tuneable design and device to shift structural resonance in vertical long shaft pumps.

BACKGROUND

Background description includes information that may be useful in understanding the present invention. It is not an admission that any of the information provided herein is prior art or relevant to the presently claimed invention, or that any publication specifically or implicitly referenced is prior art.

As is well known in the art, vertical long shaft pumps are installed to operate in the vertical direction. Vertical long shaft pumps are often used in a plurality of applications, such as, but not limited to, supply of water, in particular in the supply of drinking water, or as main pumps or as auxiliary pumps in open or closed systems, in cooling water systems, for example in nuclear power plants, for the drainage of waste water pools, or overflow basins for the prevention of flooding, drainage of large areas of a land, fire fighting in the offshore area (production of oil and gas), for example on oil platforms or floating production storage offloading units (FPSO) etc.

A conventional vertical long shaft pump (also referred to as vertical long shaft pump unit or pump hereinafter) 100 is shown in FIGS. 1A and 1B, the vertical long shaft pump includes a pumping unit which includes an inlet 102 at a lower end to allow inflow of a fluid and one or more impellers 104 for conveying the fluid, a discharge unit 106 with an outlet for the fluid, a drive unit 108, such as a motor mounted on a motor stool 110 for rotating the impellers 104, a pump can 112 extending in an axial direction and connecting the pumping unit with the discharge unit 106, a line shaft 114 extending within the pump can 112 and operatively connecting the drive unit 108 with the impellers 104, and one or more bearings. The motor stool 110 is mounted on a soleplate 116 to support the drive unit 108. The fluid to be pumped enters the pump at a suction side through the inlet 102 and flows through the pump can 112 to the discharge unit 106.

When the structural natural resonant frequency is excited by forcing frequency caused by residual imbalance, misalignment or vane pass frequency, high vibrations are encountered in the pump and this is mostly seen at high vibration at non drive end side of the motor. Sometimes a lower part of the pump also vibrates, however, this cannot be observed but effect becomes clear due to premature failure of a bearing bush and wear rings of the pump. Modes of structural resonance are shown in FIGS. 2A to 2D.

Predicted structural natural frequencies for the vertical long shaft pump as calculated by designer and manufacturer may not address piping connection stiffness and foundation connection stiffness. For the vertical long shaft pumps which are installed near seashore, the level tide plays a crucial role on the natural frequencies which cannot be predicted correctly. So, in spite of all design works, pumps may show up structural resonance related issues.

When high vibration is observed in vertical pump motor non drive end while motor is coupled with pump and operating at fixed speed, then all normal root causes are investigated with involvement of an experienced vibration analyst. Investigation of possibility of the structural resonance excited by forcing frequency is lengthy process in which all possible reasons of high synchronous vibrations are checked at a first step. Next step of investigation includes modal impact test, validation of finite element study based on results observed during modal test. In addition, mode shapes plotting, and analysis takes a considerable amount of time particularly if the machines are in remote installation. Special tools such as, a multi-channel vibration analyser, instrumented hammer and a vibration spectrum analyser are also required to detect the resonance and affected modes.

Detuning of the vertical long shaft pump unit to shift the natural frequency is complex task as most of the time two natural frequencies are closely spaced. Sometimes there are coupled above and below ground modes. Based on mode shapes of these frequencies directional stiffness (k) is changed at particular portion of the pump to shift the resonant frequency above than operating frequency. A position of stiffeners is kept near the antinode of the mode of concern. To shift the natural frequency of the vertical long shaft pump unit, a mass is added sometimes. Location of mass addition is based on modal mass participation on the particular resonant mode.

Undertaking structural modification to shift the resonant frequency of the base frame away from forcing frequency and then incorporate the modification by welding structural elements is non-reversible task and complex task as these type of activity can induce stress and cause distortion in the pump column pipe and the motor stool. To rectify these issues, controlled gas tungsten arc welding (GTAW), post weld stress reliving and final machining of column pipe flanges/motor stool are required. This is the conventional technique adopted to mitigate structural resonance of vertical long shaft pumping unit. The activities outlined above requires a very specialized engineer in structural design, a highly skilled welding engineer and well-equipped workshop.

There is, therefore, a need in the art to provide a simple, compact and cost-effective solution which can overcome the foregoing limitations in the art.

OBJECTS OF THE INVENTION

Some of the objects of the present disclosure, which at least one embodiment herein satisfies are as listed herein below.

A general object of the present disclosure is to provide a simple and efficient solution which can obviate the foregoing limitations.

An object of the present disclosure is to provide an arrangement to shift structural resonance in vertical long shaft pumps.

Another object of the present disclosure is to provide an efficient device to shift structural resonance in vertical long shaft pumps.

Another object of the present disclosure is to provide an efficient arrangement to stiffen a column pipe of a vertical long shaft pump by adding additional mass required for the column pipe to detune natural frequencies.

Yet another object of the present disclosure is to provide a simple and cost effective device for a vertical long shaft pump to increase or decreased effective stiffness of the pump, thus preventing a particular coupled or uncoupled resonant modes which falls in vicinity of an operating frequency of the pump.

These and other objects of the present invention will become readily apparent from the following detailed description taken in conjunction with the accompanying drawings.

SUMMARY

Aspects of present disclosure relate to vertical long shaft pumps. More specifically, it pertains to a simple and efficient site tuneable design and device to shift structural resonance in vertical long shaft pumps.

In an aspect, the present disclosure provides an efficient device to shift a structural resonance in a vertical long shaft pump, the device can include a pair of annular holding plates including an upper plate and a lower plate. The upper plate and the lower plate can be adapted for fitment at a non-driving end portion of a motor of the vertical long shaft pump by using a plurality of fasteners. The device further includes one or more annular plates adapted for fitment at the non-driving end portion of the motor between the upper plate and the lower plate. Each of the one or more annular plates comprises an annular central hole with splined grooves to engage with cooling fins of the motor to enable fitment of the one or more annular plates on the motor. The pair of annular holding plates, the fasteners and the one or more annular plates can be configured to add a first predefined mass on the motor of the vertical long shaft pump. The predefined mass can be based on estimation of modal mass participation of resonant frequency of concern.

In an embodiment, thickness of the each of the upper plate, lower plate and the one or more annular plates can be based on the first predefined mass.

In an embodiment, each of the upper plate and the lower plate can be annular shaped having a central hole to allow fitment at the non-driving end portion of the motor and a plurality of mounting holes.

In an embodiment, the lower plate can include splined grooves at its inner periphery for engagement with the cooling fins of the motor just as male female type fitment.

In an embodiment, the plurality of fasteners can include a plurality of threaded studs and nuts to enable fitment of the upper and lower plates through the plurality of mounting holes of the upper plate and the lower plate.

In an embodiment, the device can include a plurality of tie rods for fitment with a column pipe of the vertical long shaft pump. The plurality of tie rods can be fitted with flanges of the column pipe using Bellville washers and bolts.

In an embodiment, each of the plurality of tie rods can includes internal threading for fitments with the bolts, and square threading on an outer surface of the tie rods.

In an embodiment, the device can use column pipe flanges with holes to support the plurality of tie rods.

In an embodiment, the device can include one or more blocks with matching square internal threading for fitment with one or more of the tie rods. Each of one or more blocks can include a key hole to allow movement of the one or more blocks along length of the corresponding tie rods.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
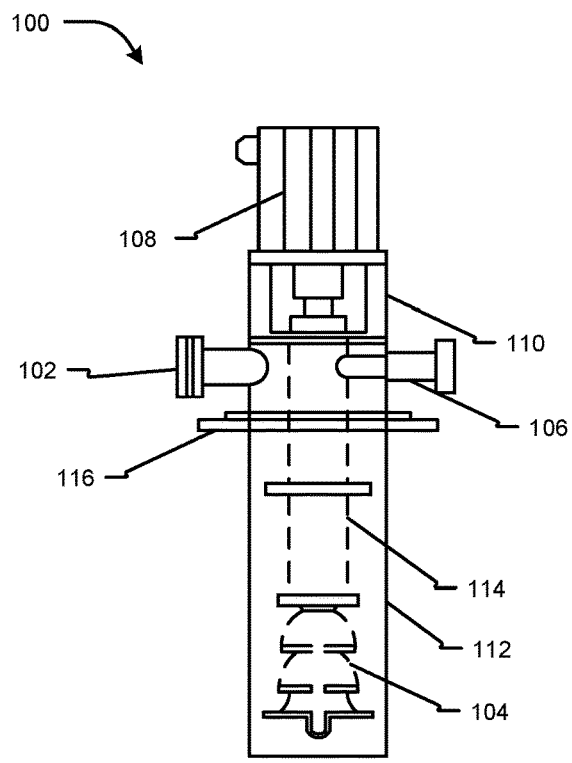
FIGS. 1A and 1B illustrate a conventional vertical long shaft pump.
Figure 1B:
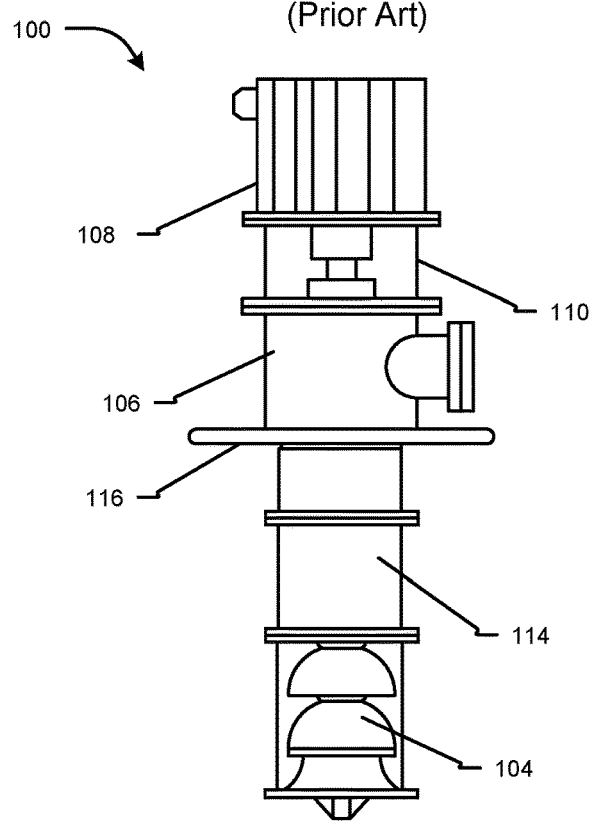

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Embodiments explained herein relate to vertical long shaft pumps. More specifically, it pertains to a simple and efficient site tuneable design and device to shift structural resonance in the vertical long shaft pumps.

When the structural natural resonant frequency is excited by forcing frequency caused by residual imbalance, misalignment or vane pass frequency, high vibrations are encountered in the vertical pump and this is mostly seen at high vibration at a non-drive end side/portion of a motor of the vertical pump. Modes of structural resonance are shown in FIG. 2A to 2D. Based on resonance modes and identification of a location of minimum displacement (nodes) and a location of maximum deflection (anti-nodes) structural modifications are carried out to detune the vertical pump unit.

The corrective action can be based on formula:

$$fn=\sqrt{(k/m)}$$

where fn: structural natural frequency causing high vibration in the vertical pump,
k: stiffness,
m: mass of affected mode at that resonance frequency (structural natural frequency).

If k or m are changed, the structural natural frequency can be changed/shifted away from vertical pump operating frequency.

Conventional corrective methods to stiffen a stool of the pump are based on welding ribs or other arrangements. However there are many cases where a mass addition on a motor or stiffening/mass addition of a column pipe of the pump are required. In that case, conventional practiced solution does not work.

In an aspect, the present disclosure provides an efficient device which can be mounted on a motor top end and the column pipe of the pump, where effective stiffness can be increased or decreased based on requirement, thus preventing a particular coupled or uncoupled resonant modes which falls in vicinity of operating frequency of the pump.

In an embodiment, the disclosed devices can be installed on a peripheral motor cooling fins to add mass and/or stiffen column pipe of the pump with provision to add weight to lower the resonant frequency based on modal mass participation in that frequency. Design of the disclosed device avoids time consuming structural modification work at site involving hot works on structural parts such as motor stool and downpipe column/can of the vertical pump.

In an embodiment, a process of detuning the vertical pump using the disclosed devices is highly reversible and fine tuning of modification is also possible to shift resonant frequencies away from the operating frequency of the pump.

Figure 3:
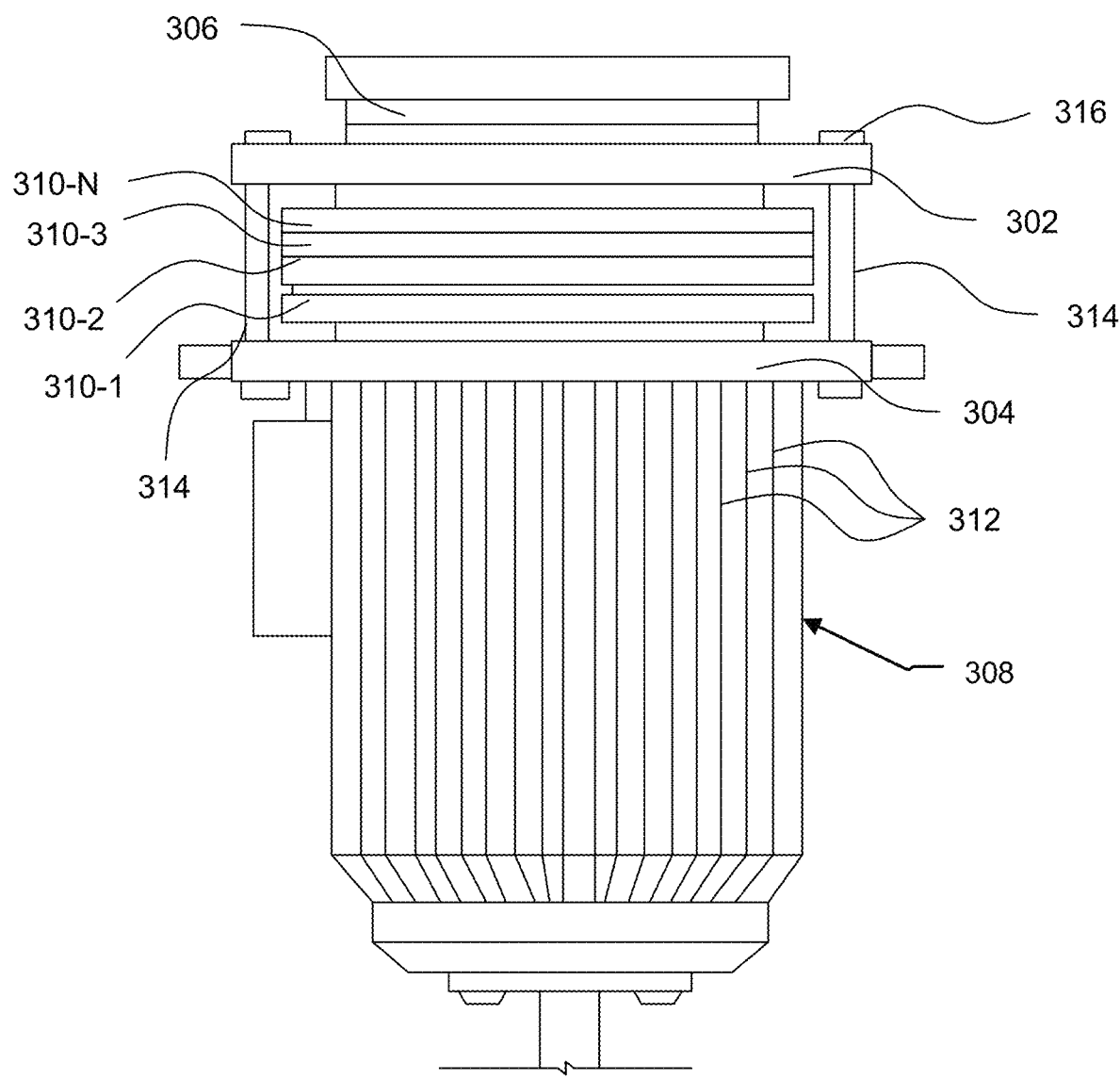
FIG. 3 illustrates an exemplary implementation of the proposed device to add mass at a non-driving end portion of a motor of a vertical long shaft pump to shift a natural resonant frequency of the vertical long shaft pump, in accordance with an embodiment of the present disclosure.

FIG. 3 illustrates an exemplary implementation of the proposed device to add mass at a non-driving end portion of a motor of a vertical long shaft pump to shift a natural resonant frequency of the vertical long shaft pump, in accordance with an embodiment of the present disclosure.

In an embodiment, to facilitate a vertical long shaft pump tunable at site, the vertical long shaft pump can be partly prefabricated based on requirement defined by resonant mode shapes of the vertical long shaft pump.

In an embodiment, the disclosed device can include a pair of annular holding plates including an upper plate 302 and a lower plate 304. The upper plate 302 and the lower plate 304 can be adapted for fitment at a non-driving end portion 306 of a motor 308 of the vertical long shaft pump by using a plurality of fasteners. The device further includes one or more annular plates such as plates 310-1, 310-2, 310-3 . . . 310-N adapted for fitment at the non-driving end portion 306 of the motor 308 between the upper plate 302 and the lower plate. Each of the annular plates 310 can include an annular central hole with splined grooves to engage with cooling fins 312 of the motor 308 to enable fitment of the annular plates 310 on the motor. The the pair of holding plates, the fasteners and the one or more annular plates can be configured to add a first predefined mass on the motor 308 of the vertical long shaft pump.

In an embodiment, each of the upper plate 302 can be annular shaped having a central hole to allow fitment at the non-driving end portion 306 of the motor 308 and a plurality of mounting holes.

In an embodiment, the plurality of fasteners can include a plurality of threaded studs 314 and nuts 316 to enable fitment of the upper plate 302 and the lower plate 304 through the plurality of mounting holes of the upper plate 302 and the lower plate 304.

In an embodiment, the lower plate 304 can include an axial split with groves matching with motor cooling fins and a plurality of mounting holes. With help of bolts 314 and nuts 316 tightened with correct torque, the split can be gripped with cooling fin and fixed to the motor.

In an embodiment, the axially split lower plate 304 can include splined grooves (shown in FIG. 6) for engagement with the cooling fins 312 of the motor.

In an embodiment, thickness of the each of the upper plate 302, lower plate 303 and the annular plates 310 can be based on the first predefined mass. Each of the upper plate 302 and the lower plate 304 can be annular shaped having a central hole to allow fitment at the non-driving end portion 306 of the motor 308.

In an embodiment, an outer diameter of the annular plates 310 can be smaller than a pitch circle diameter minus mounting hole size of the pair of holding plates 302 and 304 so that the outer diameter of the annular plates 310, does not foul with the fasteners used to create a sandwich type lumped mass at the non-driving end portion of the motor using the upper, lower and annular plates.

In an embodiment, addition of the first predefined mass on the non-driving end portion 306 (hereinafter, also referred to as a top portion) of the motor 308 can required based on mode shape and associated mass participation calculated during a structural resonance study backed by an onsite modal test. Based on above information additional mass which can be the first predefined mass can be calculated to shift the natural resonant frequency of the vertical long shaft pump. A technique of mass addition by using the components of the disclosed device may achieve a required single degree of freedom (SDOF) mode.

It has been found by various studies of computational fluid dynamics (CFD) based temperature gradient analysis that area of the no-drive end portion of the motor 308 close to a motor cooling fan has lowest temperature rise. In an embodiment, a top cover of a cooling fan cowl of the motor 308 can be removed to allow access to the fins 312 of the motor 308. In an embodiment, using cooling fin length at the no-drive end (NDE) portion of the motor 308 to add mass, the cooling fins 312 at the NDE portion of the motor 308 can be considered as male part and the annular plates 310 of various thickness with splined grooves can be considered as female part of a spline joint for fitment of the annular plates 310.

In an embodiment, based on the calculated mass/lumped mass required to detune the above ground mode shape, thickness of the upper plate 302, the lower plate and the annular plates 310 can be calculated and fabricated.

In an embodiment, the upper plate 302, the lower plate 304 and the annular plates 310 can be made of steel.

In an embodiment, the upper plate 302, the lower plate 304 and the annular plates 310 can be inserted first from a top side of the motor 308. First, the lower plate 304 is mounted, then the splined grooved annular plates 310 of required thickness can be slid through the cooling fins of the motor 308. Once the plates 310 are slid through the cooling fin, the upper plate 302 is inserted and secured using the fasteners with the lower plate 304 to create a sandwiched type arrangement which acts as the lumped mass.

Figure 4A:
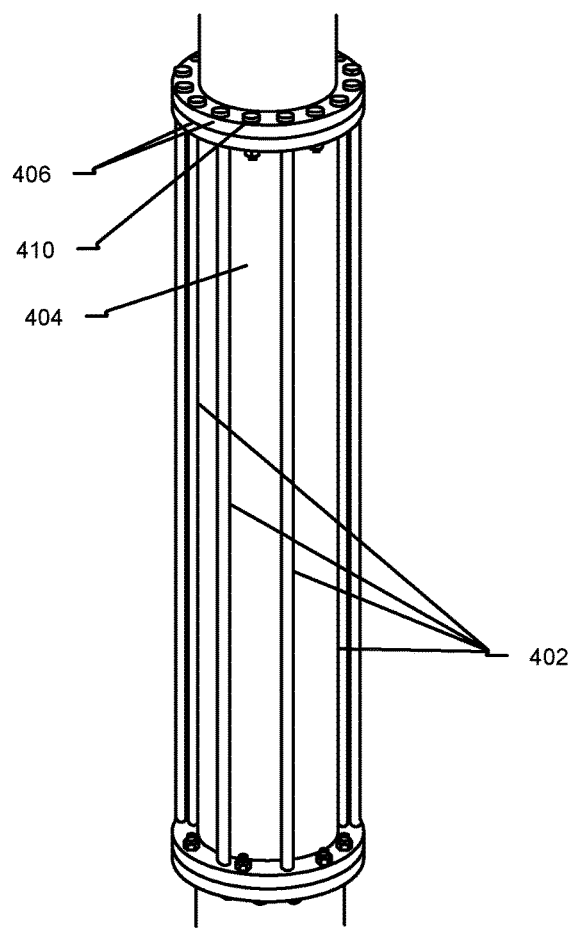
FIGS. 4A and 4B illustrate an exemplary implementation of the proposed device to stiffen and add mass to a column pipe of a vertical long shaft pump to shift a natural resonant frequency of the vertical long shaft pump, in accordance with an embodiment of the present disclosure.
Figure 4B:
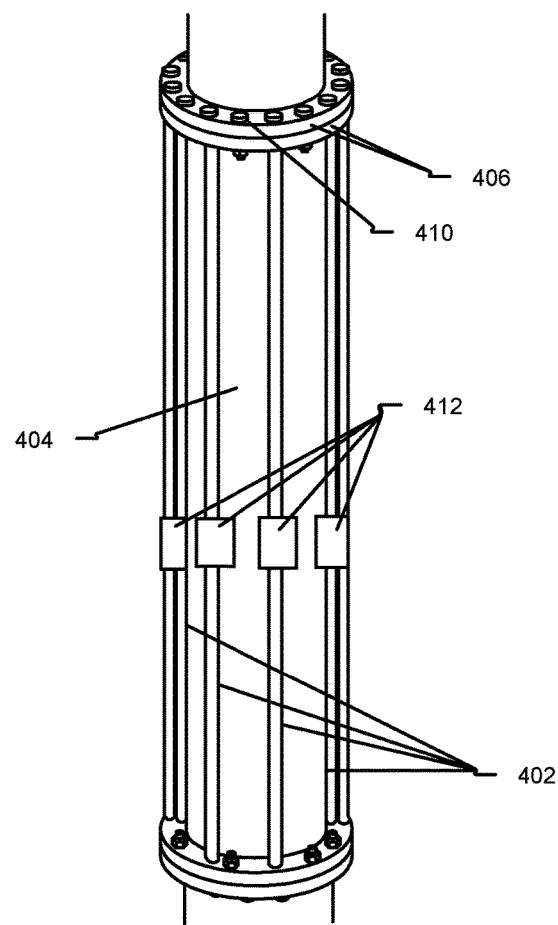

FIGS. 4A and 4B illustrate an exemplary implementation of the proposed device to stiffen and add mass to a column pipe of a vertical long shaft pump to shift a natural resonant frequency of the vertical long shaft pump, in accordance with an embodiment of the present disclosure. In an embodiment, the device can include a plurality of tie rods 402 for fitment with a column pipe 404 of the vertical long shaft pump. The plurality of tie rods 402 can be fitted with flanges 406 of the column pipe 404 using Bellville washers 408 and bolts 410.

Figure 5:
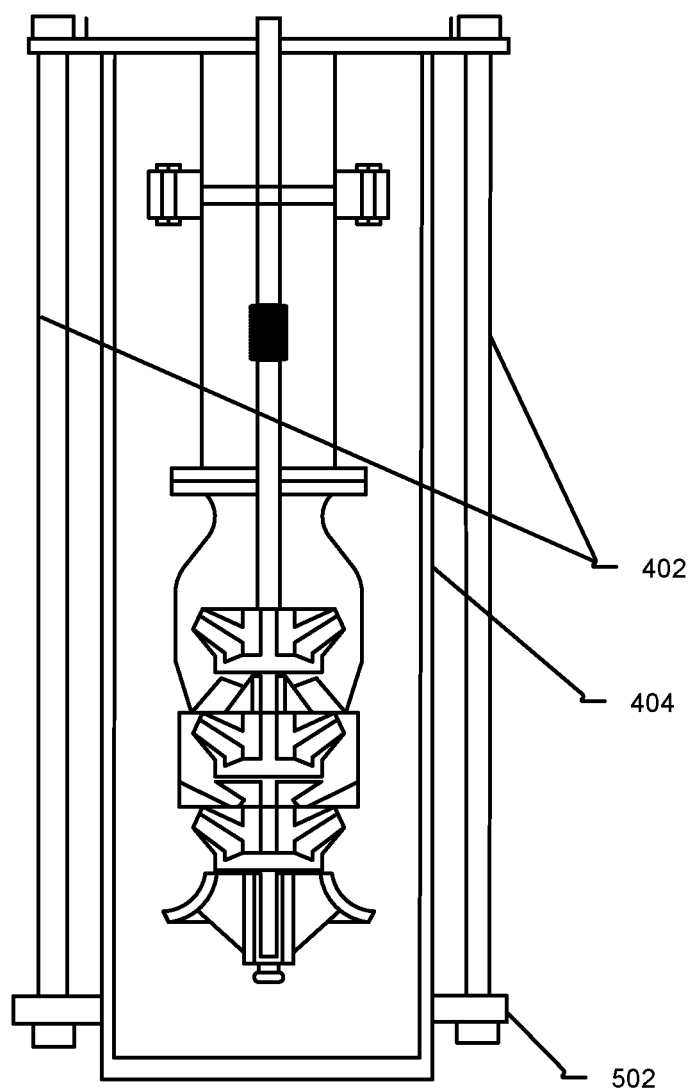
FIG. 5 illustrate a sectional view of a vertical long shaft pump with the proposed device to shift a natural resonant frequency of the vertical long shaft pump, in accordance with an embodiment of the present disclosure.

In an embodiment, the device can include one or more support plates 502 having holes as shown in FIG. 5. The support plates 502 can be coupled to a lower portion of the column pipe 404 to support the plurality of tie rods 402.

In an embodiment, each of the tie rods 402 can includes internal threading for fitments with the bolts 410. Each of the tie rods 402 can include square threading 416 on an outer surface of the tie rods 402.

In an embodiment, the device can include one or more blocks 412 with matching square internal threading for fitment with one or more of the tie rods 402. Each of one or more blocks can include a key hole to allow movement of the one or more blocks 412 along length of the corresponding tie rods 402.

In an embodiment, any portion of the column pipe 404 can be tuned using the tie rods 402 and the block 412 of the device. The tie rods 402 are used with Bellville washers 408 and nuts 414 (shown in FIG. 6) to ensure optimal tightness of the tie rods 402 running across flange joints of the column pipe 404 of the vertical pump.

In an embodiment, the square threads 614 on the tie rods 402 can be self-locking, which means the blocks 412 shall remain motionless where it was left and will not rotate backwards, regardless of how much load it is supporting. This feature helps to secure the mass block 412 in any position of the square threaded portion 614 of the tie rod 402.

As shown in FIG. 5, the support plates 502 with drilled holes can be welded to the column pipe 404 of the vertical can type pump. The drilled holes in support plates 502 can be used to install the tie rods 402.

Figure 6:
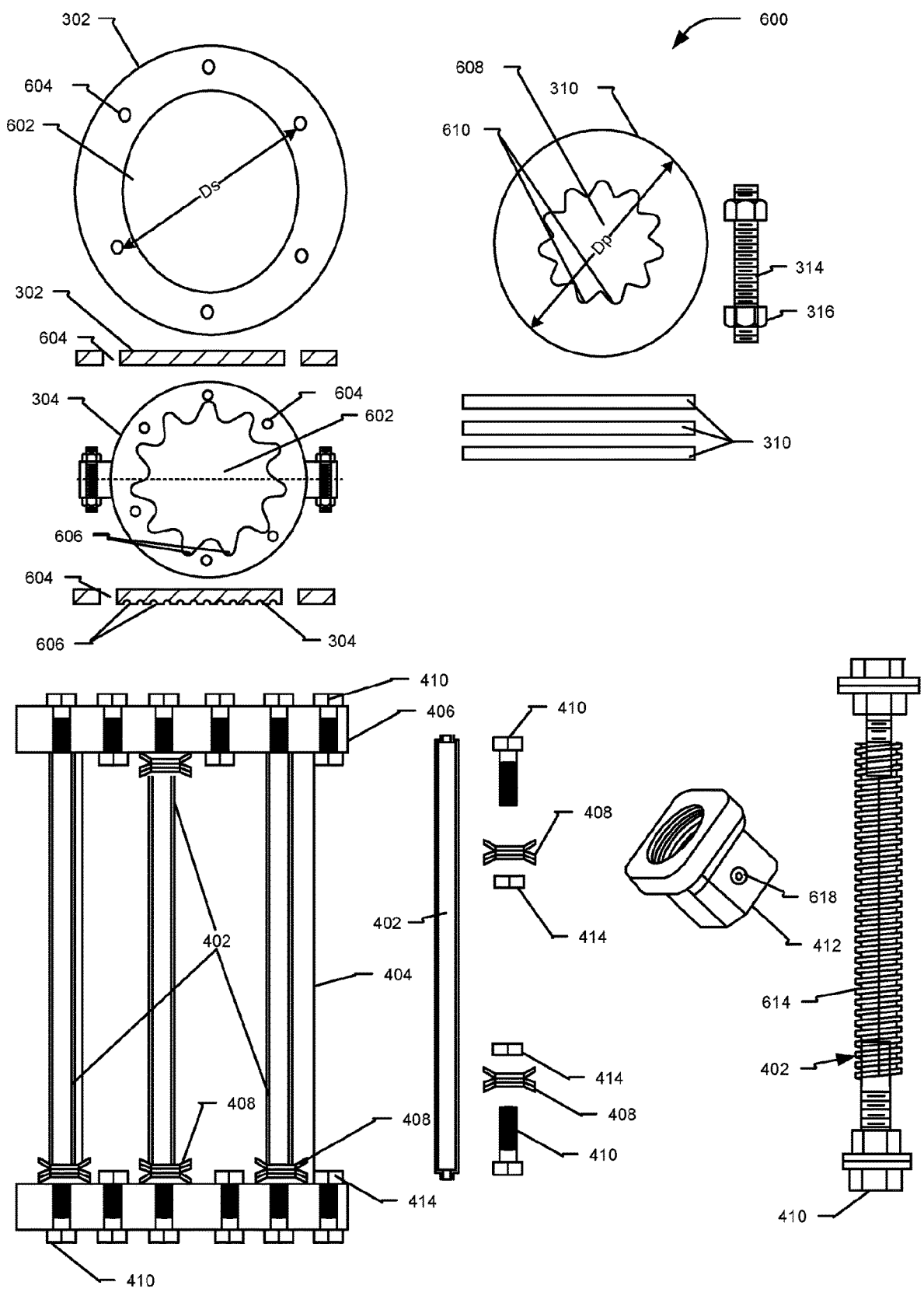
FIG. 6 illustrate an exploded view of the proposed device to shift a natural resonant frequency of a vertical long shaft pump, in accordance with embodiments of the present disclosure.

FIG. 6 illustrate an exploded view of the proposed device to shift a natural resonant frequency of a vertical long shaft pump, in accordance with embodiments of the present disclosure.

In an embodiment, the disclosed device 600 can include a pair of annular holding plates including an upper plate 302 and a lower plate 304 for fitment at a non-driving end portion 306 of a motor 308 of the vertical long shaft pump by using a plurality of fasteners such as threaded studs 314 and nuts 316. Each of the upper plate 302 and the lower plates 304 can be annular shaped having a central hole 602, and a plurality of mounting holes 604, for example six, to allow fitment at the non-driving end portion 306 of the motor 308 by using the threaded studs 314 and nuts 316.

In an embodiment, the lower plate 304 can include splined grooves 606 for engagement with the cooling fins 312 of the motor like a spline joint. In an embodiment, the lower plate 304 can include an axial split with groves 606 matching with the motor cooling fins 312.

In an embodiment, the device 600 further includes annular plates 310 adapted for fitment at the non-driving end portion 306 of the motor 308 between the upper plate 302 and the lower plate. Each of the annular plates 310 can include a hole 608 with splined grooves 610 to engage with cooling fins 312 of the motor 308 to enable fitment of the annular plates 310 on the motor.

In an embodiment, an outer diameter (Dp) of the annular plates 310 can be smaller than a pitch circle diameter minus mounting hole size (Ds) of the pair of holding plates 302 and 304 so that the outer diameter of the annular plates 310, does not foul with the fasteners used to create a sandwich type lumped mass at the non-driving end portion of the motor using the upper plate 302, lower plate 304 and the annular plates 310. This sandwiched type lumped mass may render the device with single degree of freedom.

In an embodiment, the device 600 can further include a plurality of tie rods such as a tie rod 402 for fitment with a column pipe 404 of the vertical long shaft pump. The tie rods 402 can be fitted with flanges 406 of the column pipe 404 using Bellville washers 408 (shown in FIG. 6) and bolts 410 and nuts 414.

In an embodiment, each of the tie rods 402 can includes internal threading for fitments with the bolts 410 and square threading 614 on an outer surface of the tie rods 402.

In an embodiment, the device can include one or more blocks 412 with matching square internal threading 616 for fitment with the tie rods 402. Each of one or more blocks can include a key hole 618 to allow movement of the block 412 along length of the corresponding tie rods 402.

In an embodiment, any portion of the column pipe 404 can be tuned using the tie rods 402 and the block 412 of the device. The tie rods 402 are used with the Bellville washers 408 and nuts 414 to ensure optimal tightness of the tie rods 402 running across flange joints of the column pipe 404 of the vertical pump.

In an embodiment, to shift the resonant modes where detuning the column pipe of the vertical pump is found to be most effective, prefabricated fixtures such as plain tie rods 402 or tie rods with square threads 614 and the blocks 412 with internal square threads 616 with Teflon nuts shall can be used.

Figure 2A:
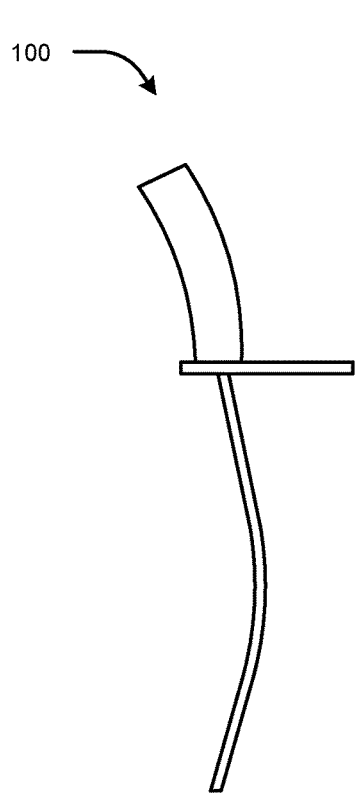
FIGS. 2A to 2D illustrates modes of structural resonance in a vertical long shaft pump.
Figure 2B:
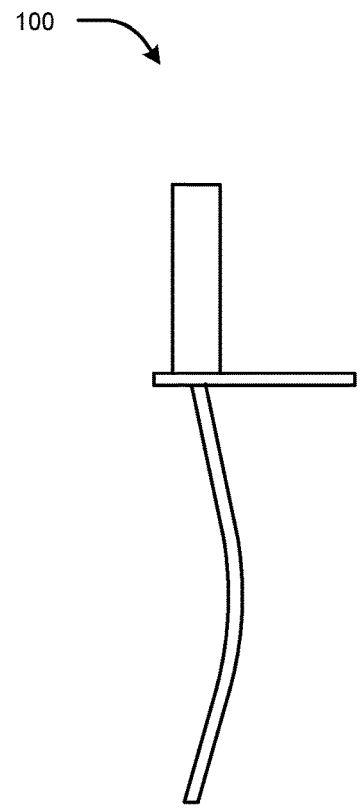
Figure 2C:
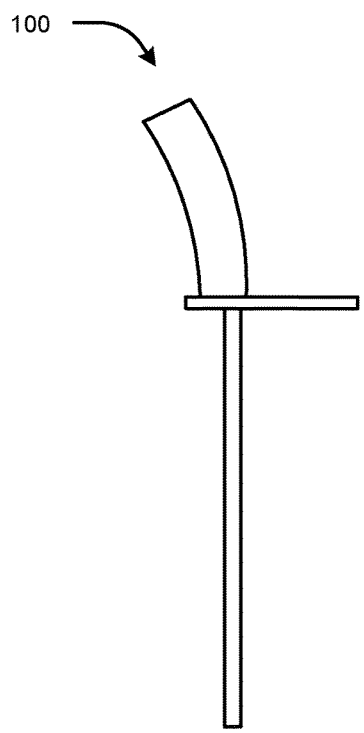
Figure 2D:
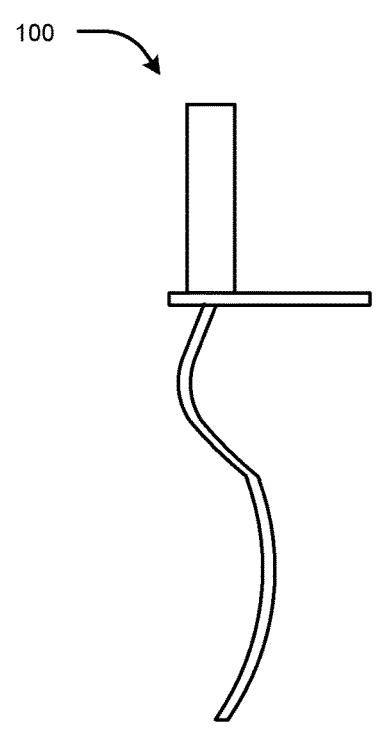

In an embodiment, to stiffen of the column pipe to shift the natural frequency, the tie rods 402 can have internal threading which corresponds outer threads of the bolts 410 to ensure secure fixation with flanges with the column pipe. To add mass in a column pipe portion of the vertical pump, the tie rods 402 are provided with the square threads 614 on its outer surface to secure the blocks 412 having a second predefined mass. The mass blocks 412 can be rotated for positioning inserting a rod into the key hole 618. The block 412 can be positioned at a required position based on a requirement of a mass to be added at particular section of column pipe. The mass block 412 can be fixed at a desired location in the corresponding tie rod 402 as shown in FIG. 2B.

In an embodiment, to tune the stiffness of the column pipe, size of tie rods 402 can be increased with same internal threads matching the outer threading of the bolts 410 to fix the tie rods 402 with the flanges of the column pipe of the vertical pump. These tie rods 402 are fitted with protrusion of the bolts 410 from the flanges of the column pipe with Bellville washers 408 and nuts 414.

In an embodiment, material of components of the device 600 can be similar to a material of the column pipe of the pump with some fine tuning such as changing number or thickness of annular plates on the motor, changing sizes or adjusting the tie rods for the column pipes. The machine vibrations resulting due to structural resonance can be brought down to acceptable values using the posed device 600.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly vione or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a simple and efficient solution which can obviate the foregoing limitations.

The present disclosure provides an arrangement to shift structural resonance in vertical long shaft pumps.

The present disclosure provides an efficient device to shift structural resonance in vertical long shaft pumps.

The present disclosure provides an efficient arrangement to stiffen a column pipe of a vertical long shaft pump by adding additional mass required for the column pipe to detune natural frequencies.

The present disclosure provides a simple and cost effective device for a vertical long shaft pump to increase or decreased effective stiffness of the pump, thus preventing a particular coupled or uncoupled resonant modes which falls in vicinity of an operating frequency of the pump.

I claim:

1. A device to shift a structural resonance in a vertical long shaft pump, the device comprising:
a pair of annular holding plates comprising an upper plate and a lower plate, the upper plate and the lower plate being adapted for fitment at a non-driving end portion of a motor of the vertical long shaft pump by using a plurality of fasteners; and one or more annular plates adapted for fitment at the non-driving end portion of the motor between the upper plate and the lower, wherein each of the one or more annular plates comprises an annular central hole with splined grooves to engage with cooling fins of the motor to enable fitment of the one or more annular plates on the motor.

2. The device as claimed in claim 1, wherein the pair of annular holding plates, the fasteners and the one or more annular plates are configured to add a first predefined mass on the motor of the vertical long shaft pump.

3. The device as claimed in claim 1, wherein thickness of the each of the upper plate, lower plate and the one or more annular plates is based on the first predefined mass.

4. The device as claimed in claim 1, wherein each of the upper plate and the lower plate are annular shaped having a central hole to allow fitment at the non-driving end portion of the motor and a plurality of mounting holes, and wherein the lower plate comprises splined grooves for engagement with the cooling fins of the motor.

5. The device as claimed in claim 4, wherein the plurality of fasteners comprises a plurality of threaded studs and nuts to enable fitment of the upper and lower plates through the plurality of mounting holes of the lower plate and the upper plate.

6. The device as claimed in claim 1, wherein the device comprises a plurality of tie rods for fitment with a column pipe of the vertical long shaft pump.

7. The device as claimed in claim 6, wherein the plurality of tie rods are fitted with flanges of the column pipe using Bellville washers and bolts.

8. The device as claimed in claim 7, wherein each of the plurality of tie rods comprises internal threading for fitments with the corresponding bolts, and square threading on outer surface of the tie rods.

9. The device as claimed in claim 8, wherein the device comprises one or more blocks with matching square internal threading for fitment with one or more of the tie rods, and wherein each of one or more blocks comprises a key hole to allow movement of the one or more blocks along length of the corresponding tie rods.

10. The device as claimed in claim 7, wherein the device comprises one or more support plates with holes, the one or more support plates being coupled to the column pipe to support the plurality of tie rods.

* * * * *